United States Patent [19]

Nakamura et al.

[11] Patent Number: 5,027,591
[45] Date of Patent: Jul. 2, 1991

[54] MOWING APPARATUS

[75] Inventors: Masaharu Nakamura; Minoru Wada, both of Tokyo, Japan

[73] Assignee: Komatsu Zenoah Company, Tokyo, Japan

[21] Appl. No.: 482,754

[22] Filed: Feb. 21, 1990

[30] Foreign Application Priority Data

| Feb. 23, 1989 | [JP] | Japan | 1-41558 |
| Feb. 23, 1989 | [JP] | Japan | 1-41559 |
| Jun. 2, 1989 | [JP] | Japan | 1-64005 |

[51] Int. Cl.⁵ ........................... A01D 34/68
[52] U.S. Cl. ........................... 56/240; 56/255; 30/276
[58] Field of Search .............. 56/10.3, 17.6, 240, 56/246, 247, 248, 255, 293, 295, DIG. 6; 475/331, 332; 74/22 R, 52; 30/276

[56] References Cited

U.S. PATENT DOCUMENTS

| 1,110,058 | 9/1914 | Hurley . |
| 2,119,683 | 5/1936 | Nevraumont . |
| 2,976,655 | 7/1959 | Speckman . |
| 3,472,007 | 8/1967 | Green . |
| 3,538,690 | 3/1967 | Hinks et al. . |
| 3,618,304 | 7/1970 | Hundhausen . |
| 3,631,658 | 1/1972 | Green ...................... 56/246 X |
| 3,701,238 | 10/1972 | Hintze, Jr. . |
| 3,740,936 | 6/1973 | Berger . |
| 3,857,177 | 12/1974 | Karubian et al. . |
| 4,196,566 | 4/1980 | Donnelley . |
| 4,310,999 | 1/1982 | Onoue . |
| 4,361,056 | 11/1982 | George ...................... 74/52 X |
| 4,451,983 | 6/1984 | Johnson et al. . |
| 4,813,291 | 3/1989 | Schumacher et al. .......... 74/52 |
| 4,848,846 | 7/1989 | Yamada et al. . |
| 4,881,363 | 11/1989 | Terai et al. ................. 56/255 |

FOREIGN PATENT DOCUMENTS

| 28443 | 4/1970 | Australia . |
| 476883 | 9/1976 | Australia . |
| 522302 | 11/1977 | Australia . |
| 68701 | 3/1981 | Australia . |
| 320330 | 2/1975 | Austria . |
| 117848 | 9/1984 | European Pat. Off. . |
| 257566 | 3/1988 | European Pat. Off. . |
| 337428 | 10/1989 | European Pat. Off. . |
| 2058984 | 6/1972 | Fed. Rep. of Germany . |
| 3812272 | 11/1988 | Fed. Rep. of Germany . |
| 2357162 | 6/1977 | France . |
| 516273 | 1/1972 | Switzerland . |
| 2199226 | 7/1988 | United Kingdom . |
| 8909538 | 10/1989 | World Int. Prop. O. . |

*Primary Examiner*—William P. Neuder
*Attorney, Agent, or Firm*—Sandler, Greenblum, & Bernstein

[57] ABSTRACT

Disclosed is a mowing apparatus, which includes a motive power source, first and second cutting wheels slidably superposed with each other and provided with a number of grass cutting edges, and mechanism for reciprocatively rotating each cutting wheel in opposite directions through a predetermined angle. The rotating mechanism includes a first shaft coupled to the first wheel, a cylindrical-shaped second shaft into which the first shaft is rotatably and coaxially inserted and coupled to the second wheel, and converting mechanism provided between the power source and the first and second shafts for converting the rotational motion from the power source into two oppositely and reciprocatively rotational motions of the first and second shaft within the predetermined angle. The rotational motion converting mechanism comprises a cam shaft rotatably driven by the motive power source, the cam shaft being provided in parallel with the first and second shafts, first and second eccentric cam plates which are eccentrically fixed to the cam shaft so as to be radially symmetrical with each other with respect to a central axis of the cam shaft, and first and second arms each having opposite ends, a concave portion being formed at one end thereof, and the other ends of the first and second arms being fixedly coupled to the first and second shafts, each concave portion of the first and second arms being adapted to receive each of the first and second cam plates, in such a manner that the first and second arms can be pivotably oscillated in mutually opposite directions to each other in accordance with the rotation of the first and second cam plates.

7 Claims, 6 Drawing Sheets

MOWING APPARATUS

BACKGROUND OF THE INVENTION

1. Field of the Invention

The present invention relates to a mowing apparatus which has two cutting wheels each having a plurality of edges at the outer periphery thereof, which are oscillated to each other to mow grass or sprig or the like as scissors. This invention can be embodied in portable type mowers or trimmers, shoulder type mowers or trimmers, or vehicular type mowers or trimmers (including mowers or trimmers mounted on a truck or the like). Further, this invention can also be embodied in vehicle type or push type lawn mowers, hedge trimmers, edgers, or soy or barley reapers. Furthermore, the apparatus of this invention can also be used as an attachment for a construction machine or an industrial machine.

2. Description of the Prior Art

Figure 1:
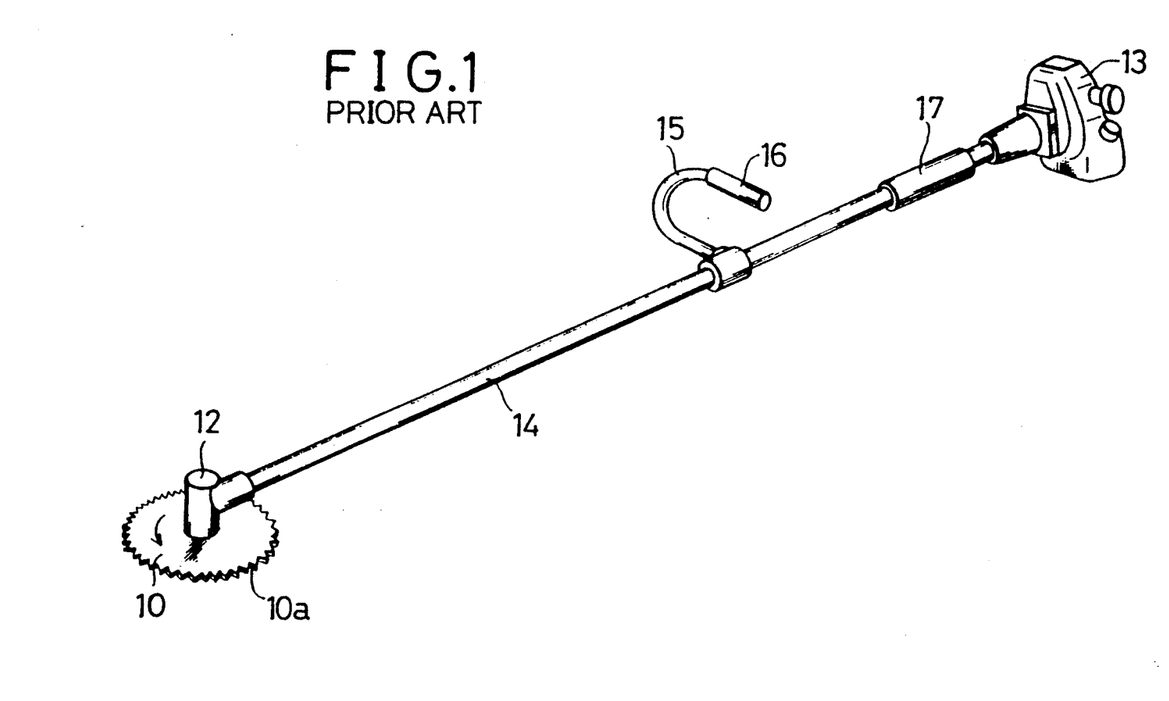
FIG. 1 is a perspective view showing the first prior-art mowing machine.

In prior-art mowing machines for mowing grass or weeds, for example as shown in FIG. 1, a single rotary cutting wheel 10 having a number of cutting edges 10a at the outer periphery thereof is rotatably supported by a bearing case 12 (cutter support body) and driven by an engine 13 via a transmission shaft rotatably passed through a hollow pipe 14 connected between the bearing case 12 and the engine 13. A handle 15 including a first grip 16 is fixed at roughly the middle of the hollow pipe 14, and a second grip 17 is directly fitted onto the hollow pipe 14 so that the worker can swing the cutting wheel 10 to and fro by gripping the grips 16 and 17 by both hands.

When the worker grips the two grips 16 and 17 and swings the hollow pipe 14 to and fro, grass can be mowed by the cutting wheel 10 driven by the engine 13 at a relatively high speed.

In this prior-art mowing machine, however, since only the single cutting wheel 10 rotated at a relatively high speed, there exist various problems such that pebblestones may be kicked off and soft grass cannot be well mowed even when the cutting wheel 10 is moved violently to and fro.

In view of the problems in the prior-art mowing machine, the applicant of this application has been proposed an improved mowing apparatus which is shown in EP patent application No. 0,257,566. Specifically, as clearly shown in FIGS. 2, 3 and 4, the proposed mowing apparatus comprises a pair of upper and lower pivotal cutting wheels 20 and 21 which are superposed with each other. These two wheels are adapted to reciprocatively rotate in two mutually opposite directions (clockwise and couterclockwise) through a predetermined angle in order to mow grass between two cutting edges 20a, 21a, formed along each outer periphery of the two cutting wheels 20 and 21. That is to say, in this apparatus, grass can be cut off in a shearing mode as with a pair of scissors.

Figures 2, 3:
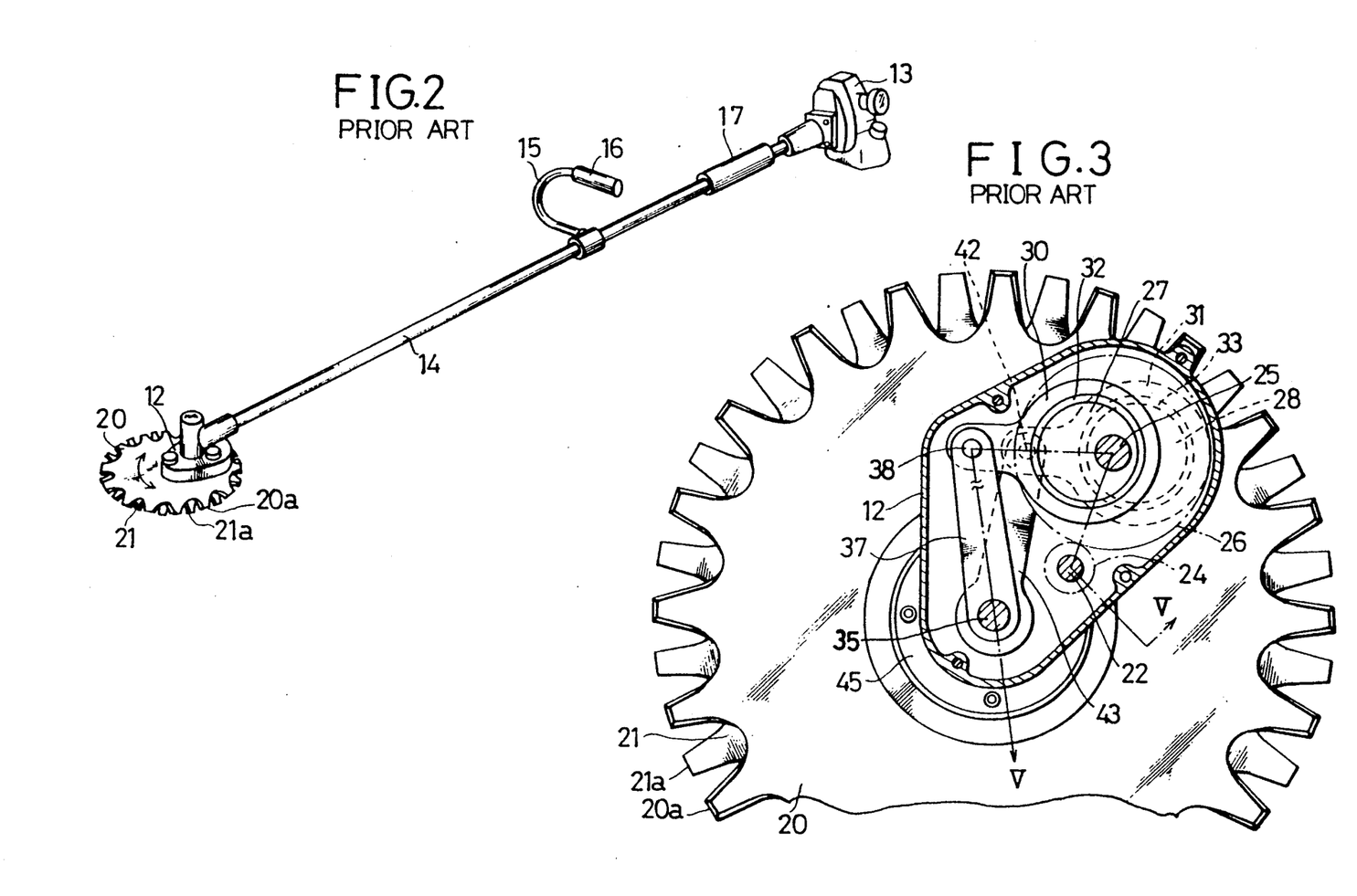
FIG. 2 is a perspective view showing a proposed mowing apparatus which has two cutting wheels.
FIG. 3 is an enlarged cross-sectional view showing cutting wheels and a rotational motion converting mechanism of the mowing apparatus in FIG. 2.
Figure 4:
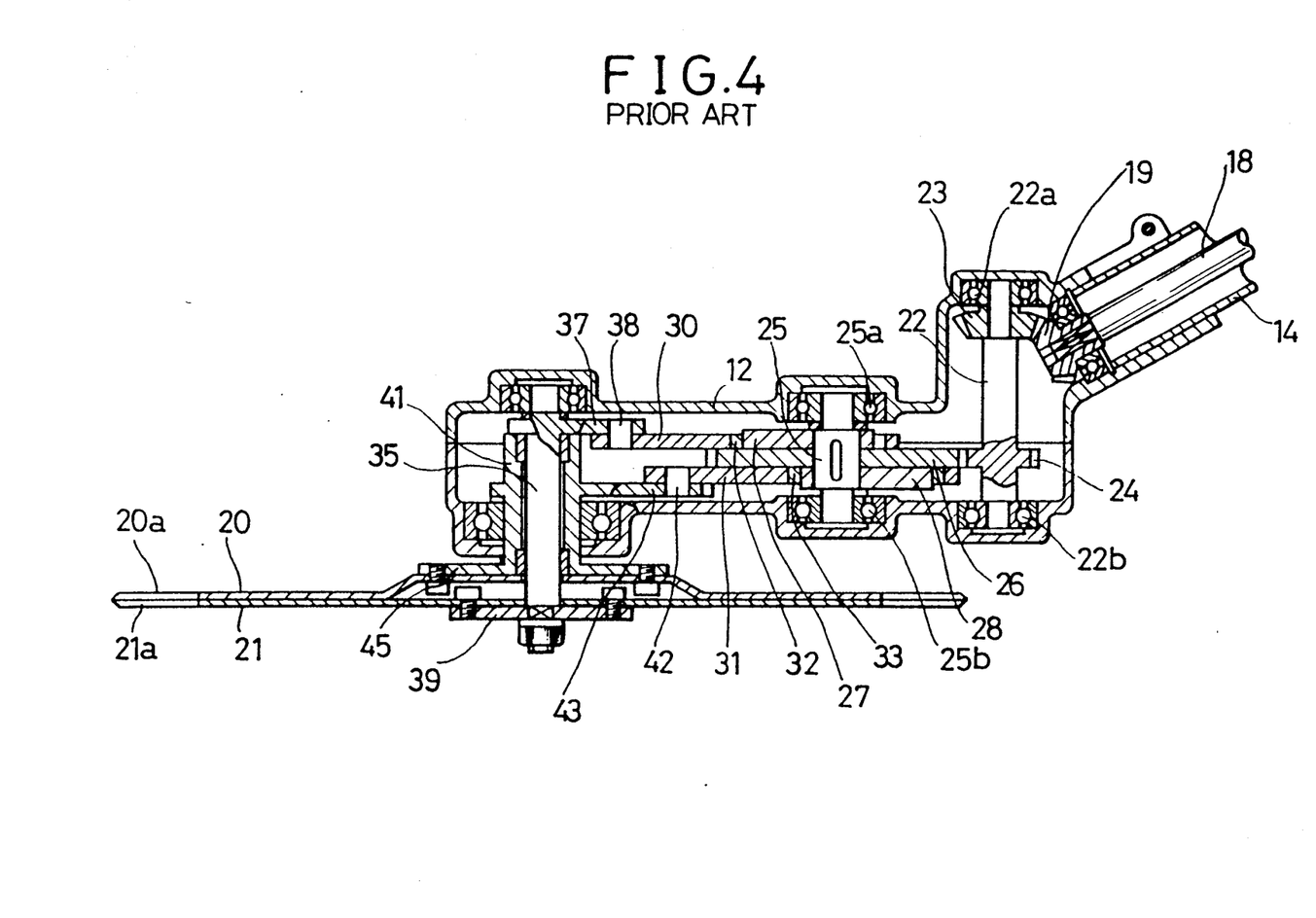
FIG. 4 is an enlarged cross-sectional view taken along a line V—V in FIG. 3.

In this prior-art apparatus, a transmission shaft 18 passing through the hollow pipe 14 and driven by an engine 13 is rotatably supported by a bearing provided on a junction point between the bearing case 12 and the hollow pipe 14. At the lowermost end of the transmission shaft 18, a first bevel gear 19 is fixed. An intermediate shaft 22 is rotatably supported vertically within the bearing case 12 through bearings 22a, 22b. A second bevel gear 23 which is in mesh with the first bevel gear 19 is fixed on the intermediate shaft 22. A small spur gear 24 is formed on the intermediate shaft 22. Additionally, a cam shaft 25 is also rotatably supported within the bearing case 12 through bearing 25a, 25b and a large spur gear 26 is fixed to the cam shaft 25 so as to be in mesh with the small spur gear 24. Further, two circular and eceentric cam plates 27 and 28 are fixed to the cam shaft 25 with keys. Each of two upper and lower annular connecting rods 30 and 31 is fitted to each of the cam plates 27 and 28, respectively via each of two bearings 32 and 33.

A pivotal cutting wheel shaft 35 is also rotatably supported vertically within the bearing case 12. An upper arm 37 is fixed to at one end thereof the uppermost end of the pivotal cutting wheel shaft 35, and the other end of the upper arm 37 is pivotably linked through a pin 38 to a projecting end of the upper annular connecting rod 30. Further, a lower cutter wheel support plate 39 is fixed to the shaft 35.

On the other hand, a cylindrical member 41 formed with a lower arm 43 and an upper cutter wheel support plate 45 is rotatably fitted around the pivotal cutter wheel shaft 35. An end of the lower arm 43 is also pivotably linked through a pin 42 to a projecting end of the lower connecting rod 31. Further, the upper cutting wheel 20 is fixed to an upper cutting wheel support plate 45 as shown in FIGS. 3 and 4.

In this mowing appratus, the cam shaft (25), the upper and lower cam plates (27, 28), the upper and lower annular connecting rods (30, 31), the bearings (32, 33), the upper and lower arms (37, 43), the pivotal cutting wheel shaft (35) and the cylindrical member (41) constitute a rotational motion converting mechanism which converts rotational motion supplied from a motive power source into two oppositely and reciprocatingly rotational motions of two superposed cutting wheels.

In operation, when the engine 13 is driven, rotational motion is transmitted to the cam shaft 25 by way of the transmission shaft 18, the first bevel gear 19, the second bevel gear 23, the small spur gear 24 and the large spur gear 26, so that the cam shaft 25 is rotated. Therefore, the two circular eccentric cam plates 27 and 28 fixed to the cam shaft 25 is also rotated, so that the two connecting rods 30 and 31 are driven reciprocably to and fro in FIG. 3. In this case, since the connecting rods 30 and 31 are located in radially symmetrical positional relationship to each other with respect to the central axis of the cam shaft 25, the two arms 37 and 43 connected to the two connecting rods 30 and 31 respectively are driven in two opposing directions, respectively. As a result, the two upper and lower pivotal cutting wheels 20 and 21 are mutually and reciprocatingly rotated through a small angle toward two different directions, respectively, to shear off grass caught between two cutting edges 20a, 21a of the upper and lower pivotal cutting wheels 20 and 21. Therefore, it is unnecessary for the worker to chop grass by swinging the machine as in the conventional machine, because the machine according to the present invention mows grass in shear mode as scissors.

The proposed mowing apparatus could successfully solve, the problems in the prior-art mowing machine as described above, and further have the additional advantages in its operational ability and cutting efficiency. However, nevertheless the advantages of the proposed mowing apparatus, the inventors of this application further improved the apparatus in order to simplify the structure thereof, to attain cost reduction in manufacturing by reducing the number of assembling parts thereof, and make adjustment of the rotation angle easy.

SUMMARY OF THE INVENTION

Therefore it is an object of the present invention to provide an improved two-wheel type mowing apparatus which has a simple structure of a rotational motion converting mechanism thereof.

Another object of the present invention is to provide an improved two-wheel type mowing apparatus which can prevent the apparatus from being damaged by, an excessive torque or shock which is produced when a rigid material is caught between cutting edges of the cutting wheels.

In order to achieve the above-mentioned objects, a mowing apparatus according to the present invention comprises:

a motive power source for supplying rotational motion;

a pair of first and second pivotal cutting wheels slidably superposed with each other and each provided with a number of grass cutting edges; and A mechanism for reciprocatively rotating each cutting wheel in opposite directions through a predetermined angle, respectively, the rotating a mechanism comprising a first shaft coupled to the first wheel, a cylindrical-shaped second shaft into which the first shaft is rotatably and coaxially inserted and coupled to the second wheel, and converting means provided between the power source and the first and second shafts for converting the rotational motion from the power source into two oppositely and reciprocatively rotational motions of the first and second shaft within the predetermined angle.

The motive power source is an engine, an electrical motor or a hydraulic pressure motor.

The converting means comprises (a) a cam shaft rotatably driven by the motive power source, the cam shaft being provided in parallel with the first and second shafts (b) first and second eccentric cam plates which are eccentrically fixed to the cam shaft along the longitudinal direction thereof so as to be radially symmetrical with each other with respect to a central axis of the cam shaft, and (c) first and second arms each having opposite ends, a concave portion being formed at one end thereof, and the other ends of the first and second arms being fixedly coupled to the first and second shafts, respectively, each concave portion of the first and second arms being adapted to receive each of the first and second cam plates, respectively, in such a manner that the first and second arms can be pivotably oscillated in mutually opposite directions to each other in accordance with the rotation of the first and second cam plates, whereby the first and second cutting wheels being reciprocatively rotated relative to each other about the common axis of the shafts through the predetermined angle.

Further, the apparatus according to the present invention may comprise means for biasing one of the first and second cutting wheels toward the other cutting wheel to attain good shearing mode.

The biasing means may comprise a spring disposed between the first and second arms in such a manner that the first shaft is pushed up by the biasing force of the spring against the second shaft.

Furthermore, the mowing apparatus of the present invention may comprise means for interrupting transmission of the rotational motion from the power source to the cam shaft when the mutually rotational motions of the cutting wheels are suddenly stopped by catching a rigid substance between the cutting edges of the first and second cutting wheels to produce an excessive torque.

BRIEF DESCRIPTION OF THE DRAWINGS

The features and advantages of the mowing apparatus according to the present invention over the proposed mowing apparatus will be more clearly understood from the following description of the preferred embodiments of the present invention taken in conjuntion with the accompanying drawings in which like reference numerals designate the same or similar elements or sections throughout the figures thereof and in which.

DETAILED DESCRIPTION OF THE PREFERRED EMBODIMENTS

Referring now to the drawings, preferred embodiments of the mowing apparatus according to the present invention will be described.

Figure 5:
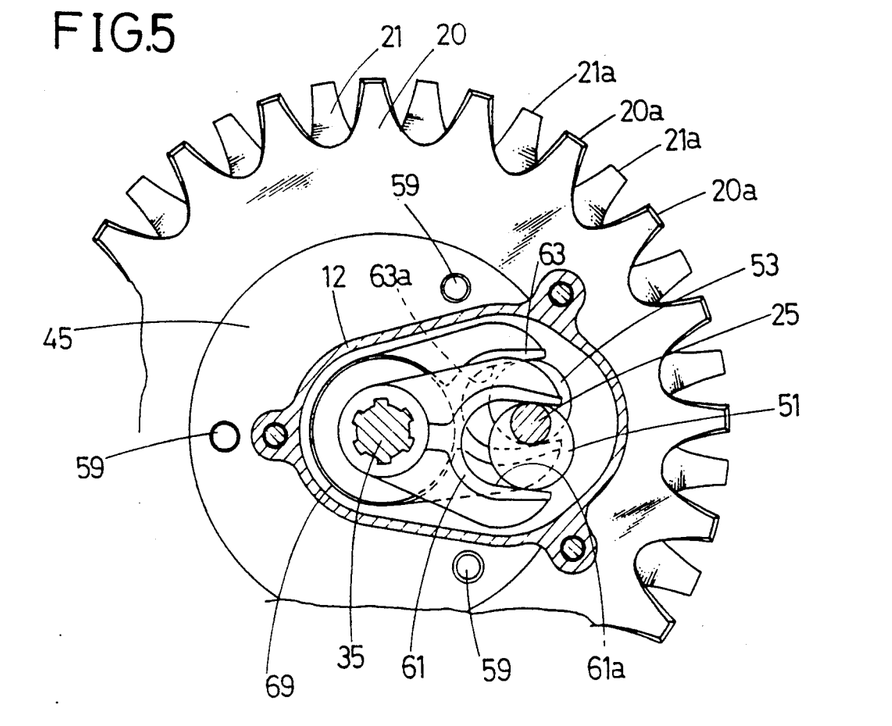
FIG. 5 is an enlarged plan view showing a pair of pivotal cutting wheels and a rotational motion converting mechanism incorporated in a first embodiment of the mowing apparatus according to the present invention.
Figure 6:
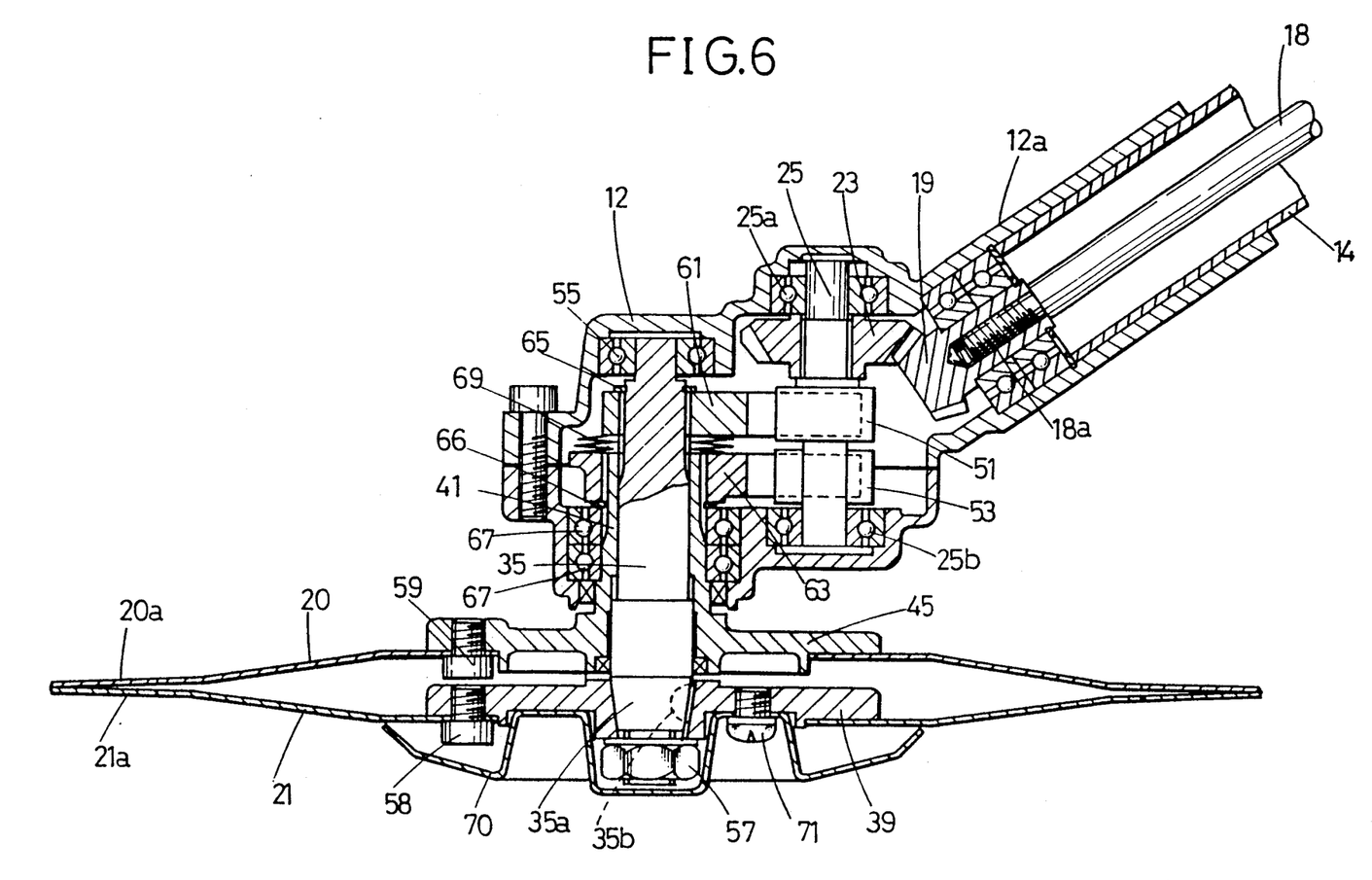
FIG. 6 is an enlarged cross-sectional view of the pivotal cutting wheels and the rotational motion converting mechanism shown in FIG. 5.

As appeared in FIGS. 5 and 6, the feature of a mowing apparatus of a first embodiment resides in the structure of a rotational motion converting mechanism which converts rotational motion supplied from a motive power source into two oppositely and reciprocatingly rotational motions of two superposed cutting wheels. Therefore, the whole structure of the apparatus of this embodiment is substantially the same as that of prior-art apparatus shown in FIG. 2 excepting the structure of the rotational motion converting mechanism.

Namely, as shown in FIG. 2, the mowing apparatus according to this embodiment comprises an engine 13 as a motive power source, a hollow pipe 14 connected at one end thereof to the engine 13 through which a transmission shaft 18 is rotatably inserted, a bearing case 12 connected to the other end of the hollow pipe 14. In the bearing case 12, the rotational motion converting mechanism is housed. A pair of pivotal cutting wheels 20, 21 slidably superposed with each other are operatively disposed to the bearing case 12. Each cutting wheel 20, 21 has a plurality of cutting edges 20a, 21a on its outer periphery.

In more detail in FIGS. 5 and 6, the hollow pipe 14 through which the transmission shaft 18 rotatably passes is fitted to a junction portions 12a of the bearing case 12. A first bevel gear 19 which is rotatably provided at the junction portion 12a through bearings is fixedly mounted to a screw shaft portion 18a formed at the lower end of the transmission shaft 18.

A cam shaft 25 is rotatably supported vertically within the bearing case 12 through two upper and lower bearings 25a and 25b. A second bevel gear 23 is fixed to the cam shaft 25 through a spline, which is in mesh with the first bevel gear 19. Further, two (upper and lower) circular and eccentric cam plates 51 and 53 are fixed to the cam shaft 25. Here, it should be noted that these two circular cam plates 51 and 53 are eccentrically fixed to the cam shaft 25 in vertical direction thereof along the longitudinal direction thereof so as to be radially symmetrical with each other with respect to the central axis of the cam shaft 25.

A pivotal cutting wheel shaft 35 is also rotatably supported vertically within the bearing case 12 via a bearing 55. An upper arm 61 having a U-shaped concave portion 61a at one end thereof is fixedly coupled at the other end thereof to the upper most end of the pivotal cutting wheel shaft 35 with a spline. Further, the upper arm 61 is anchored to the pivotal cutting wheel shaft 35 through a snap spring 65 so as not to be disengaged therefrom in the axial direction of the shaft 35. The upper arm 61 is adapted to receive the upper cam plate 51 at the concave portion 61a thereof so as to be slidably engaged therewith, thereby being pivoted in accordance with the rotation of the upper cam plate 51.

Further, a lower cutting wheel support plate 39 is fitted to a tapered lower end portion 35a of the pivotal cutting wheel shaft 35 with keys 35b and fixed to the shaft 35 by a nut 57. The lower cutting wheel 21 is fixed to the lower cutting wheel support plate 39 with a plurality of bolts 58 as shown in FIG. 6.

On the other hand, a cylindrical member 41 is rotatably, slidably and coaxially fitted around the pivotal cutting wheel shaft 35 with a spline. A lower arm 63 having a concave portion 63a at one end thereof is fixedly coupled at the other end thereof with the uppermost end of the cylindrical member 41. The lower arm 63 is also adapted to receive the lower cam plate 53 at the concave portion 63a so as to be slidably engaged therewith, thereby being pivoted in accordance with the rotation of the lower cam plate 53.

As the upper and lower cam plates 51, 53 are eccentrically fixed to the cam shaft 25 so as to be radially symmetrical with each other, the upper and lower arms 61, 63 are pivoted in mutually opposite directions relative to each other in accordance with the rotation of the cam shaft 25.

The lower arm 63 is anchored to the cylindrical member 41 with a snap spring 66 at the under surface thereof. The cylindrical member 41 is rotatably disposed in the bearing case 12 through bearings 67 so as not to be displaced toward the axial direction thereof. An upper cutting wheel support plate 45 is integrally formed on the lower end of the cylindrical member 41. The upper cutting wheel 20 is fixed to the upper cutting wheel support plate 45 with bolts 59 as shown in FIG. 6. Accordingly, the upper and lower cutting wheels 20, 21 are reciprocatively rotated in opposite directions relative to each other with respect to the common axis of the shafts 35 and the cylindrical member 41 through a predetermined angle.

Between the upper and lower arms 61 and 63, there is disposed a disc spring 69 as biasing means around the pivotal cutting wheel shaft 35 in such a manner that the pivotal cutting wheel shaft 35 is normally biased upwardly through the upper arm 61 against the cylindrical member 41. This means the lower cutting wheel 21 is normally pressed against the upper cutting wheel 20, thus creating a proper contacting pressure between the wheels 20, 21. As the biasing means, a plurality of dish springs can be employed.

A cover 70 is fixed to the lower surface of the lower cutting wheel support plate 39 by screws 71 so as to cover the bolts 58 and a nut 57.

Namely, in this embodiment of the present invention, the rotational motion converting mechanism comprises the cam shaft (25), the upper and lower cam plates (51, 53), the upper and lower arms (61, 63), the pivotal cutting wheel shaft (35), and the cylindrical member (41).

In operation, when the engine 13 is driven, power is transmitted to the cam shaft 25 by way of the transmission shaft 18, the first bevel gear 19 and the second bevel gear 23, so that the cam shaft 25 is rotated. In accordance with the rotation of the cam shaft 25, the two circular cam plates 51 and 53 fixed to the cam shaft 25 are also rotated. Then, since the cam plates 51 and 53 are eccentrically fixed to the cam shaft 25 so as to be radially symmetrical with each other with respect to the central axis of the cam shaft 25, the two arms 61 and 63 are pivoted in two opposing directions, respectively. In accordance with the pivotal motions of the first and second arms 61 and 63, the pivotal cutting wheel shaft 35 and the cylindrical member 41 are mutually and reciprocatingly rotated toward the opposite directions through a predetermined angle with each other, respectively. As a result, the two upper and lower pivotal cutting wheels 20 and 21 are driven so as to reciprocatingly rotate in mutually opposite directions through the predetermined angle, whereby cutting grass between two cutter edges 20a and 21a of the upper and lower pivotal cutting wheels 20 and 21. Therefore, this apparatus can mow grasses in shearing mode as scissors.

In the present invention, an upper and a lower cutting wheels 43 and 45 are formed as a dish shape, respectively. The periphery of each cutting wheel on which a plurality of cutting edges 20a and 21a are formed is slightly bent toward the opposite cutting wheel. Therefore, when the upper and lower cutting wheels 20 and 21 are mated together in such a manner that the cutting edges of each cutting wheel are overlapped to each other, the cutting wheels contact with each other only at the tip portions of the cutting edges of the cutting wheels.

According to the rotational motion converting mechanism of the present invention as described above, the following advantages are realized in comparison with that of the prior proposed mowing apparatus:

(1) According to the present invention, the size of the bearing case 12 of the mowing apparatus in which the compactified in comparison with that of the bearing case of the prior proposed mowing apparatus.

Specifically, in the prior mowing apparatus, the rotational motion converting mechanism comprises a pair of eccentric cams 27 and 28 fixed to the cam shaft 25, a pair of upper and lower annular connecting rods 30, 31 each having a projecting end and linked to the cam, respectively, and upper and lower arms 37 and 43 fixed to the pivotal cutting wheel shaft 35. Each of the upper and lower arms 37 and 43 is linked with the projecting end of each of the connecting rods 30, 31 with a crank angle, and the linkage point is laterally protruded from the line connected between the shafts 25 and 35. In contrast with this, according to the present invention, the upper and lower arms 61, 63 do not protrude laterally as those of the prior proposed mowing apparatus as described above. Further, due to its structure of the rotational motion converting mechanism of the prior mowing apparatus, the distance between the shafts 25 and 35 becomes longer than that of the mowing apparatus of the present invention.

(2) According to the present invention, the number of parts which constitutes the rotational motion converting mechanism is smaller than that of the prior mowing apparatus.

Namely, according to the present invention, it is not necessary to provide parts corresponding to the annular connecting rods 30 and 31 and the bearings 32 and 33 of the prior mowing apparatus, so that the number of the parts becomes smaller than that of the prior mowing apparatus. This means that the assembly of the parts can easily performed and that the manufacturing cost of the apparatus can be reduced.

(3) According to the present invention, adjustment between the parts of the rotational motion converting mechanism, which regulate the rotation angle of the cutting wheels can be easily performed in comparison with the prior mowing apparatus, since in the structure of the rotational motion converting mechanism of the present invention the number of factors which affect the decision of the rotational angle of the cutting wheels is less than that of the prior mowing apparatus.

Namely, according to the present invention, the factors such as the diameter of each cam 51, 53 and the distance between the shafts 25, 35 affect the decision of the rotation angle of the wheels, On the other hand, according to the prior mowing apparatus, the additional factors such as the lengths of each of the upper and lower arms 37, 43 and each of the upper and lower connecting rods affect the amount of the rotation angle of the wheels. Therefore, according to the present invention, it becomes possible to easily obtain a proper rotation angle of the cutting wheels by adjusting these parts mentioned above in comparison with the prior mowing apparatus.

Figure 7:
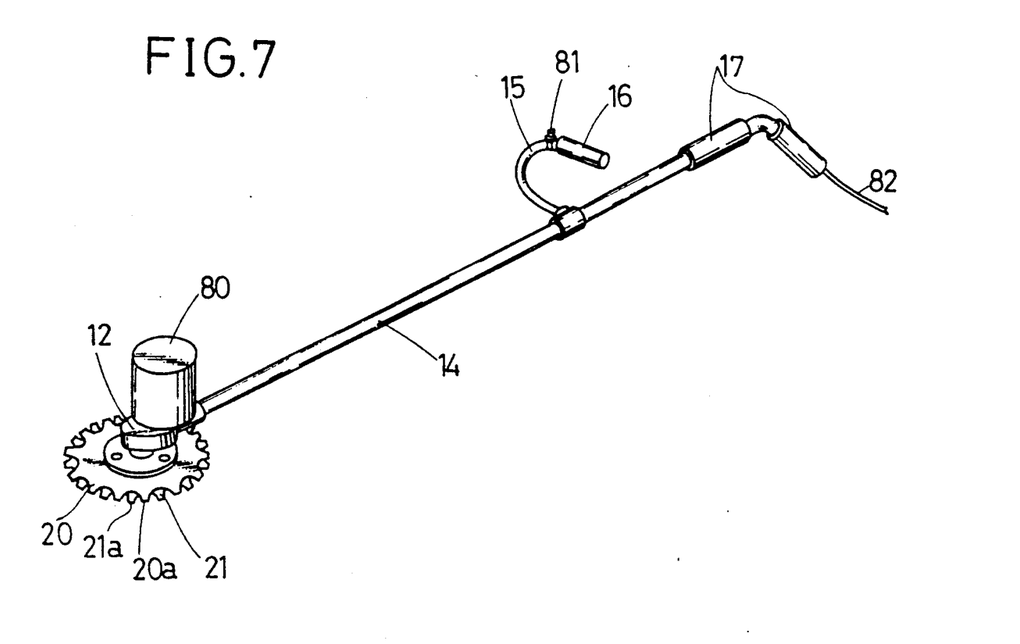
FIG. 7 is a perspective view showing a second embodiment of the mowing apparatus according to the present invention.

FIG. 7 shows a second embodiment of the mowing apparatus according to the present invention.

In the type of mowing apparatus having two pivotal cutting wheels, it is preferable to provide a power transmission interruption mechanism somewhere in the apparatus in order to prevent cutting edges 20a and 21a of upper and lower cutting wheels 20, 21 from being damaged when a rigid substance such as a metal piece or the like is caught between the cutting edges. In the light of this, in this embodiment, a power transmission interruption mechanism provided between a cam shaft 25 and a electrical motor 80 as a power motive source.

Figure 8:
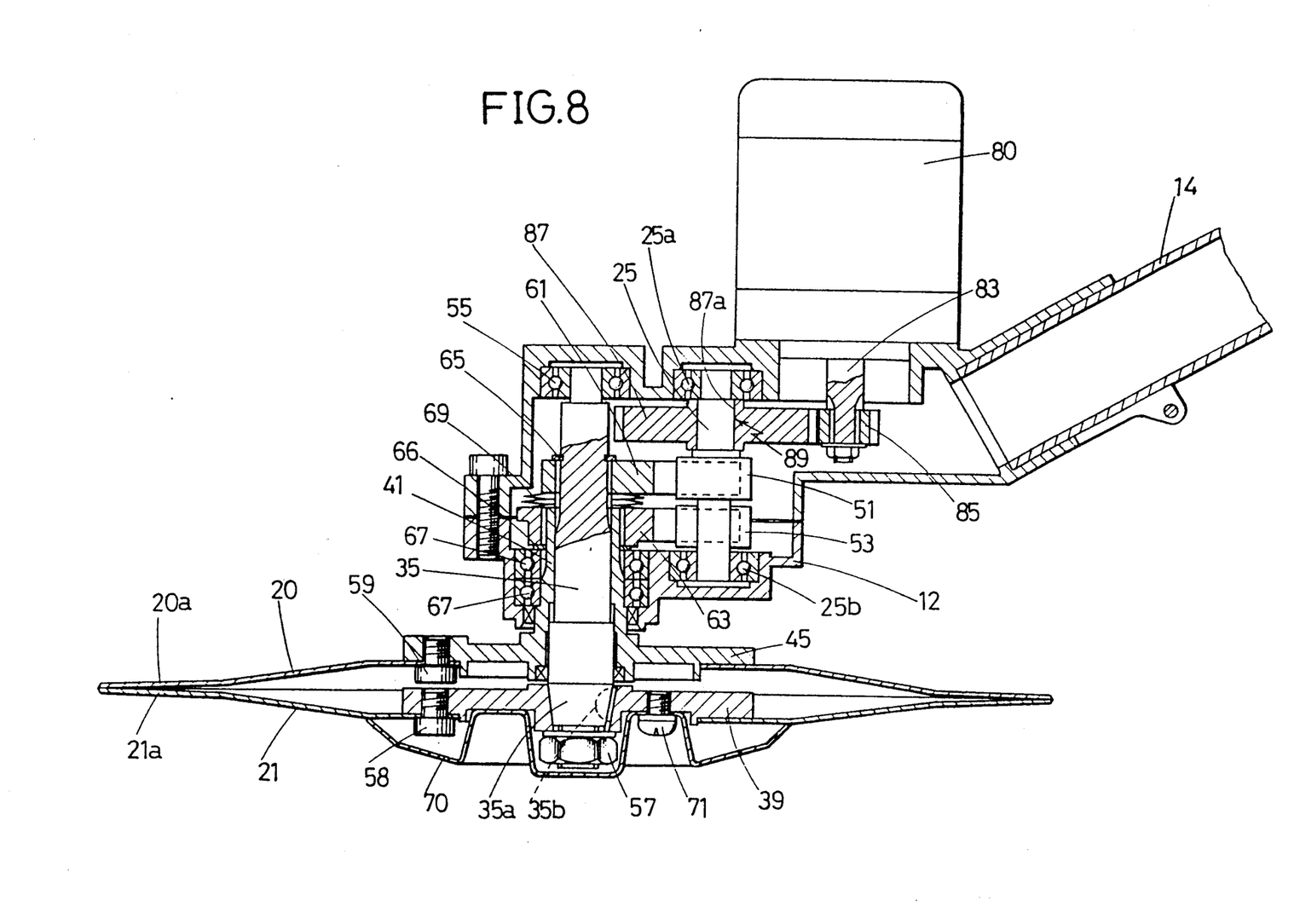
FIG. 8 is a cross-sectional view of a main part of the mowing apparatus shown in FIG. 7.

Namely, the second embodiment as shown in FIG. 7 and 8, a handle 15 including a first grip 16 is fixed at roughly the middle of the hollow pipe 14, and second grips 17 are directly fitted onto the pipe 14. A switch 81 of the motor 80 is fitted to the handle 15. The motor 80 is connected to power supply through a code 82 which passes into the hollow pipe 14. The electrical motor 80 is disposed on a bearing case 12 provided at the top end of the hollow pipe 14, and a rotational power of the motor 80 is transmitted to the cam shaft 25 through a drive shaft 83 of the motor 80.

Excepting the above-described structure, this embodiment has the same structure as that of the first embodiment of the present invention. Therefore, it is believed that detailed explanation of the common parts is unnecessary if the same reference numerals are allotted to the corresponding parts between the two embodiments.

Specifically, on the drive shaft 83 of the motor 80, there is fixed a small spur gear 85. On the other hand, on the cam shaft 25, a large spur gear 87 having, a central bore 87a is mounted by tightly pressing the shaft 25 into the bore 87a of the large spur gear 87, and thus constituted large spur gear 85 is in mesh with the small spur gear 85. Therefore, the rotational motion from the motor 80 is transmitted to the cam shaft 25 through the small and large spur gears 85 and 87 with reducing the rotational speed of the drive shaft 83 of the motor 80.

In this case, the inner diameter of the bore 87a of the large spur gear 87 is set to be substantially the same as the diameter of the cam shaft 25. Therefore, the large spur gear 87 is simply fitted to the cam shaft 25 through a frictional force between the outer peripheral surface of the cam shaft 25 and the surface of the bore 87a of the gear 87. Consequently, if a torque more than the frictional force is applied to fitting portion of the large spur gear 87 to the cam shaft 25, slip will be caused between the members, so that no rotational power is transmitted from the motor 80 to the cam shaft 25. This means that power transmission from the motor 80 to the cam shaft 25 will be interrupted when, for example, a rigid substance is caught between the edges 20a, 21a of the upper and lower cutting wheels 20, 21. As a result, it becomes possible to prevent the apparatus from being damaged by such an accident.

In this embodiment, it is of course possible to utilize a shear-pin or a friction clutch mechanism instead of the above-mentioned mechanism.

Further, it is of course possible to drive the cutting wheels by an engine or a hydraulic motor instead of the motor.

It must be understood that the invention is in no way limited to the above embodiments and that many changes may be brought about therein without departing from the scope of the invention as defined by the appended claims.

What is claimed is:

1. A mowing apparatus comprising:
   a motive power source for supplying rotational motion;
   a pair of first and second cutting wheels slidably superposed with each other and each of the wheels being provided with a number of grass cutting edges; and
   means for reciprocatively rotating each cutting wheel in opposite directions through a predetermined angle, respectively, the rotating means comprising a first shaft coupled to the first wheel, a cylindrical-shaped second shaft into which the first shaft is rotatably and coaxially inserted and coupled to the second wheel, and converting means provided between the power source and the first and second shafts for converting the rotational motion from the motive power source into two oppositely and reciprocatively rotational motions of the first and second shafts within the predetermined angle,
   wherein the converting means comprises:
   a cam shaft rotatably driven by the motive power source, the cam shaft being provided in parallel with the first and second shafts;

first and second eccentric cam plates which are eccentrically fixed to the cam shaft in vertical direction thereof so as to be radially symmetrical with each other with respect to a central axis of the cam shaft; and first and second arms each having opposite ends, a concave portion being formed at one end thereof, and the other ends of the first and second arms being coupled to the first and second shafts, respectively, each concave portion of the first and second arms being adapted to receive each of the first and second cam plates, respectively, in such a manner that the first and second arms can be pivotably oscillated in mutually opposite directions to each other in accordance with the rotation of the first and second cam plates, whereby the first and second cutting wheels being reciprocatively rotated relative to each other toward opposite directions about an axis of the shafts through the predetermined angle.

2. The mowing apparatus as set forth in claim 1, wherein each of the concave portions of the first and second arms has a U shape.

3. The mowing apparatus as set forth in claim 1, further comprises means for biasing one of the first and second cutting wheels toward the other cutting wheel.

4. The mowing apparatus as set forth in claim 3, wherein the biasing means comprises a spring disposed between the first and second arms in such a manner that the first shaft is pushed up by the biasing force of the spring with respect to the second shaft.

5. The mowing apparatus as set forth in claim 1, further comprises means for interrupting transmission of the rotational motion from the power source to the cam shaft when the rotational motions of the cutting wheels are suddenly stopped by catching a hard substance between the cutting edges of the first and second cutting wheels to produce an excessive torque.

6. The mowing apparatus as set forth in claim 5, wherein the interrupting means comprises:
a first gear rotated by the rotational motion of the motive power source;
a second gear in mesh with the first gear, and the second gear having a central bore; and
a clutch mechanism which is formed by tightly fitting the cam shaft into the central bore of the second gear in such a manner that a predetermined frictional force which keeps the cam shaft engaged with the second gear until the excessive torque is exerted is produced between a peripheral surface of the cam shaft and a surface of the bore of the second gear.

7. A mowing apparatus driven by rotational motion supplied from a motive power source, comprising:
a pair of first and second cutting wheels slidably superposed with each other and each of the wheels being provided with a number of grass cutting edges; and
means for reciprocatively rotating each cutting wheel in opposite directions through a predetermined angle, respectively, the rotating means comprising a first shaft coupled to the first wheel, a cylindrical-shaped second shaft into which the first shaft is rotatably and coaxially inserted and coupled to the second wheel, and converting means provided between the power source and the first and second shafts for converting the rotational motion from the power source into two oppositely and reciprocatively rotational motions of the first and second shafts within the predetermined angle; and
means for interrupting transmission of the rotation motion from the power source to the cam shaft when the mutually rotational motions of the cutting wheels are suddenly stopped by catching a hard substance between the cutting edges of the first and second cutting wheels to produce an excessive torque.

* * * * *